Oct. 11, 1949.    C. H. YOUNGQUIST    2,484,663
PRESSURE SEALED STUFFING BOX
Filed Nov. 1, 1946

Inventor:
Carl H. Youngquist
By: Joseph O. Lange

Patented Oct. 11, 1949

2,484,663

UNITED STATES PATENT OFFICE 2,484,663

PRESSURE SEALED STUFFING BOX

Carl H. Youngquist, Chicago, Ill., assignor to Crane Co., Chicago, Ill., a corporation of Illinois Application November 1, 1946, Serial No. 707,161

3 Claims. (Cl. 286—26)

This invention relates to a flexible sealing means and more particularly it refers to a stuffing box which is positively affected by the increase in pressure within a vessel or the like.

One of the advantages of this invention is that as the pressure increases in the vessel, as for example in a valve or the like, the load affecting the packing in the stuffing box is not merely equal to the load exerted by the pressure in the vessel, as in the case of the conventional stuffing box, but is many times greater than the internal pressure due to a hydraulic ram effect created. Ordinarily, as the pressure increases within a vessel, or the like, the stuffing box will have a tendency to leak unless the packing is pulled up sufficiently tight generally by independent means employed. The diaphragm or flexible member of my invention preferably placed at the base or inner portion of the stuffing box is acted upon by the pressure within the system and transfers the resulting load to the packing and thus substantially prevents leakage at this point otherwise arising due to the increased pressure within.

Another advantage of this invention is that the stuffing box on a valve, vessel or the like can be packed upon assembly, with the gland or cap being tightened to provide a pre-loaded packing condition. The usual future adjustments on the gland or cap are now eliminated since internal pressure would control the loading on the packing independent of that initiated by the pre-loading operation.

A further advantage of this invention is that it allows for a more compact design of stuffing box than heretofore provided.

Other advantages and objects arising from my contribution will become more readily apparent upon proceeding with the following specifications read in light of the accompanying drawings in which.

Similar reference characters refer to similar parts in the several views shown.

Figure 1:
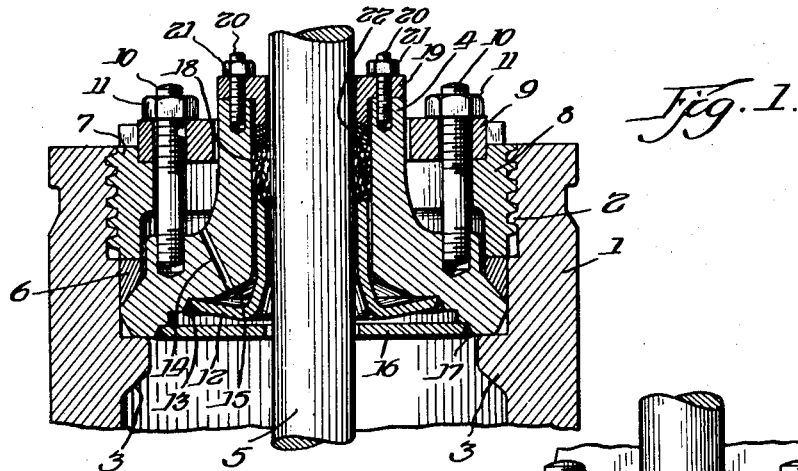
Fig. 1 is a sectional assembly view of a novel valve stuffing box arrangement with the pressure sealed packing feature.

Referring now to Fig. 1, the upper portion of a valve body 1 is shown. The upper stem actuating or lifting mechanism and the lower portion of the valve with its closure member are not shown since these are conventional and the invention lies solely in the stuffing box region. The valve body 1 has internal threads 2 to receive the pressure sealed bonnet joint shown. The lugs 3 in the body 1 are provided to aid in the assembly of the valve bonnet to support the latter member as indicated, for the pressure sealed type of bonnet 4 in assembly is placed inside the body neck over the valve stem 5 and allowed to rest on the body lugs 3. The bonnet gasket 6, preferably of a soft resilient metal material, is slipped over the bonnet into its recess in the bonnet shown. Next the screwed ring 7 is threadedly engaged in the body threads 2. The lugs 8 of this screwed ring form a rest as well as a bearing while under load for the bonnet support plate 9. The bonnet 4 has studs 10 and nuts 11 which act to unify the pressure seal joint assembly as well as to supply an initial load to the gasket for sealing against pressures lower than that necessary to actuate or lift the bonnet and thus produce a pressure seal.

The stem 5, which extends through the stuffing box illustrated is here designated as a valve stem. However, it may be any type of stem or shaft which functions by passing through a stuffing box, as for example from one medium and into another such as a system having room or atmospheric pressure on the outside and high pressure fluids on the inside. Thus the stem could be controlling a closure member as in a valve or operating a piston as in a steam engine etc. It may be a rotating or a non-rotating type and reciprocably movable stem or it may have a motion combining both rotary and reciprocable movements without adversely affecting the application of this invention.

The valve bonnet 4 shown is the pressure seal type; however this is shown merely for illustrative purposes and could very well be of the more conventional bolted bonnet construction.

The bonnet 4 is provided with a flexible member or a gland 12 actuated by a flexible flange made of a suitable resilient metal which is seam welded in place on its outer periphery as shown at 13. It is pointed out that the essence of this invention lies in the functioning of this member. It is unique in that through being hingedly flexible it responds to the pressure inside the vessel or valve in order to apply the desired increasingly higher compression load on the packing 18. The inside diameter of the flexible member or gland 12 actuated by its annular flange is similar to that of standard gland practice, thus allowing a relatively free reciprocal and rotative movement of the stem. To one side of the valve bonnet 4 is an air vent 14 which allows the entry of atmospheric pressure in the recess or chamber 15 in the bonnet thereby eliminating any pressure build-up under the flexible element and retarding the functioning of the flange 12.

At the base of the bonnet 4 a plate 16 is preferably provided which may be considered as a back-seating plate for the valve, as well as a means affording physical protection including a thermal shield for the flexible member. This plate is fastened to the bonnet 4 by any suitable means as for example by the seam weld 17.

The packing 18 is held in place within the elongated portion of the bonnet 4 forming the stuffing box under an initial loading by the gland 19 or cap which is held by the studs 20 and nuts 21. The spacers 22 shown may optionally be used as means of adjusting the compression on the packing 18 in its initial assembly. It is thus apparent that a simple compact and effective means has been devised for compressing shaft packing commensurate with the pressure load to be encountered.

Figure 2:
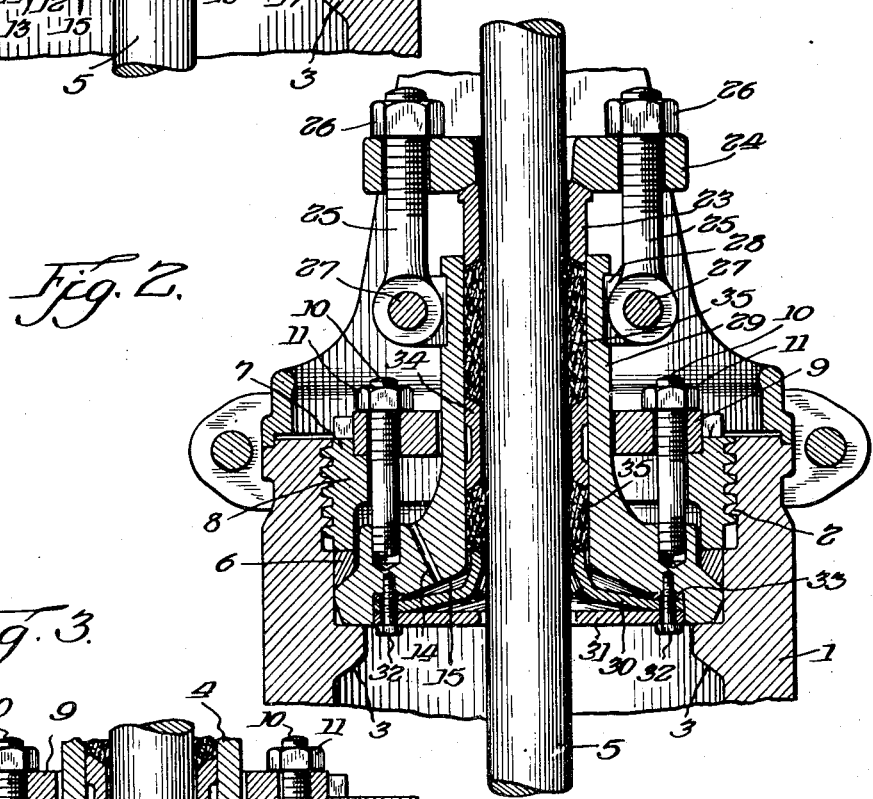
Fig. 2 is a sectional assembly view of a conventioal stuffing box adapted with the pressure sealing feature.

In Fig. 2 a valve section is shown employing the conventional stuffing box, gland, and with the gland flange arrangement modified to use the construction embodying my invention. The gland 23 is held in position by the gland flange 24 which is in turn held down by means of the eyebolts 25 and the nuts 26. The eye-bolts 25 are held in place by locking bolts 27 and nuts (not shown) which also hold the split ring 28 in place in a groove as illustrated in the upper end portion of the valve bonnet 29. In this figure the flexible member 30 is shown in one of the several modified forms which it may assume. It is fastened in place by a bolted plate 31 which in the instant modification also serves as the protecting plate designated 16 in Fig. 1. The cap screws 32 are also used to maintain the necessary compression load for forming an annular seal in cooperation with the gasket 33. The flexible member 30 is here shown with only a short gland or neck section as may be the case where the use of certain metals prevent any deep drawing. In this case a filler piece or lantern 34 is inserted between the several superposed rings of packing 35.

Figure 3:
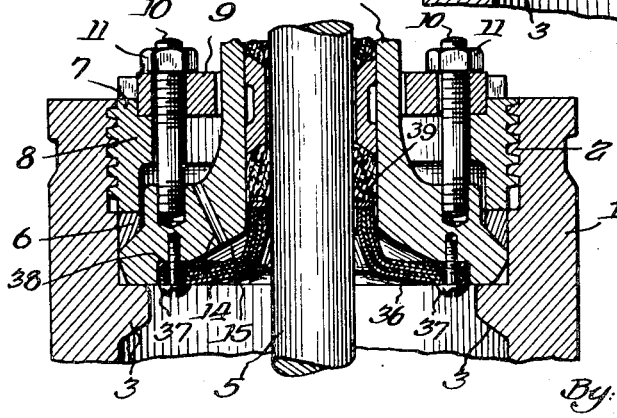
Fig. 3 shows a modified construction of the pressure sealing member embodying the invention.

A further modification is illustrated in Fig. 3 which shows a sectional view of the annular flexible member 36 modified to consist of a plurality of superposed nested plates. Here in the case of metals and other materials, a laminated form of construction is provided in order that the life of the member 36 may be lengthened, depending on its use and service as well as its mode of manufacture. The screws 37 hold the plates at their outer peripheries against the washer 38, although a weld structure may be used here as described in connection with Fig. 1. Preferably the transverse annular ends of the nested plates bear against the packing washer 39.

The modifications thus described show various shapes and types of construction which the respective flexible members 12, 30 and 36 may take. Obviously there may be other forms they may assume, but it is the principle of having a flexible member or, as it was hereinbefore referred to, a gland having a flexible flange and being moved when exposed to sufficient pressure inside the vessel or the like whereby the pressure within the vessel acts upon the annular area of the flexible flange or diaphragm to produce a compression load upon the packing. This load expressed in pounds per unit area will be many times that of the actual pressure per unit area within the vessel, depending on the actual dimensions of the diaphragm and the area affected in the stuffing box, and embodies the principle of the hydraulic ram. The flexible member acts like a single bellows flange, a diaphragm, or a spring washer which is held hingedly on its outside periphery. Through its inherent ability to flex, it is free to move axially depending upon the internal pressure of the piping system with which it is associated. The means of fastening the circular fulcrum or hinge whether it be by welding, or bolts or screws 37 as shown in Fig. 3 may vary according to the conditions under which it is used. The protecting plate 31 of Fig. 2 and 16 of Fig. 1 may or may not be necessary depending upon conditions warranting such construction. The plate may have a threaded edge ring for holding it, the flexible member and sealing gasket in place or it may be welded or fastened as shown.

The bonnet as shown has a recess or annular chamber designated 15 in Fig. 1 for providing an air relief space behind the flexible member. The chamber 15 also functions as a means of allowing the flexible member sufficient movement for the packing compression to be performed but yet inhibiting substantial movement which might introduce fatigue or strain in the spring characteristics of the flexible member.

It will be apparent that the stuffing box is self adjusting with relation to the internal pressure of the vessel, valve or the like. The upper cap or gland may be of the comparatively simple construction shown in Fig. 1 or it may be threadedly engaged directly applied to the stuffing box similar to the union bonnet type of valve construction.

The pressure responsive element of my invention allowing a multiplied loading condition on the packing insures a maintainance of tightness in the stuffing box in vessels, valves or the like while they are at high pressures. It will also find use in high pressure containers, pumps, steam engine and compressor piston rods where the reductions in pressure ease the pressure of the packing against the moving stem or piston rod. It is also useful with devices in which reciprocating rods or shafts enter pressure systems where alternating increases and decreases in pressure loads are imposed on a packing.

It is the desire therefore that the scope of this invention be measured by the appended claims interpreted in light of the prior art.

I claim:

1. A stuffing box sealing arrangement for a pressure vessel comprising a stuffing box, a stem with a portion thereof within the said stuffing box, packing for the stuffing box, a gland with a longitudinal annular portion within said stuffing box and having a flexible flanged portion fastened peripherally to a portion thereof annularly adjacent to the stuffing box, the flexible flanged portion extending substantially transversely to that portion of the gland extending into the stuffing box, the packing being compressed by the said gland upon application of fluid pressure against a substantially transverse surface of the said flanged portion of the gland.

2. A flexible gland member for a stuffing box of the character described, the gland comprising a neck portion and a flexible flanged portion extending substantially transversely to the said neck portion, the flanged portion having an area substantially greater than a transverse section of the neck portion and being peripherally held against transverse movement, a stuffing box to receive the gland, the flexible flanged portion of the gland being movable angularly relative to the neck portion whereby upon the application of fluid pressure to a transversely extending face on the flexible flanged portion the neck portion of the gland is axially moved into the stuffing box.

3. In a stuffing box sealing arrangement comprising a bonnet, a stuffing box, a gland, the said latter member including a pressure responsive flexible means comprising a plurality of laminated members, the said laminated members being annularly fastened to the said bonnet, a stem within the stuffing box, and packing held therebetween, the said flexible means being pressure responsive to effect a compression load upon the said packing, the free ends of the laminated members being formed to extend in a direction substantially transverse to the annularly fastened portions of the laminated members.

CARL H. YOUNGQUIST.

REFERENCES CITED

The following references are of record in the file of this patent:

UNITED STATES PATENTS

| Number | Name | Date |
|---|---|---|
| 1,170,450 | Lachmann | Feb. 1, 1916 |
| 2,211,122 | Howard | Aug. 13, 1940 |
| 2,354,270 | Marco | July 25, 1944 |

FOREIGN PATENTS

| Number | Country | Date |
|---|---|---|
| 471,022 | Germany | 1929 |